March 11, 1947.   R. H. PETERSON   2,417,212

FLUID-PRESSURE CONTROLLED VALVE

Filed Dec. 12, 1942   3 Sheets-Sheet 1

INVENTOR.
ROBERT H. PETERSON
BY
A. R. McCrady
ATTORNEY.

INVENTOR.
ROBERT H. PETERSON
BY
A. R. McCrady
ATTORNEY.

Patented Mar. 11, 1947

2,417,212

UNITED STATES PATENT OFFICE 2,417,212

FLUID-PRESSURE CONTROLLED VALVE

Robert H. Peterson, South Bend, Ind., assignor to Bendix Aviation Corporation, South Bend, Ind., a corporation of Delaware Application December 12, 1942, Serial No. 468,769

10 Claims. (Cl. 137—153)

This invention relates to fuel or oil tank pressure control systems, and particularly to pressure regulators in aircraft where the fuel or oil in the tanks must be kept at superatmospheric pressure to prevent boiling of volatile fuel or cavitation at the oil pump, especially when the aircraft is operating at higher altitudes.

It has been the practice to provide pressure systems for the fuel tanks of aircraft which have been arranged to utilize pressure supplied from the manifold of a supercharged engine, which is normally at superatmospheric pressure during engine operation. A problem present with the use of pressure to prevent cavitation and/or boiling has been the need of accurate pressure control in the range of altitudes where the use of pressure is indicated, and the complete release of pressure below altitudes where its use is not required. Where the use of pressure is required it is obviously desirable to have its value controlled closely, so that an unnecessary excess is never obtained, since many devices such as carburetors are partly dependent for their proper operation upon a more or less constant pressure being supplied to them, and also since the most efficient operation of fuel or oil pumps is dependent in part upon the pressure of the fuel or oil supplied at the inlet stages thereof.

Another desirable property in a fuel pressure regulator, particularly in aircraft, is that of extreme sensitivity to altitude changes, and it is generally important that the regulator be made inoperative and the pressure in the tank expended at altitudes below those at which the superatmospheric tank pressure is required for preventing fuel boiling or oil pump cavitation. The importance is unquestioned in the case of punctured gas tanks even of the self-sealing type which otherwise tend to spray fuel when the tank is under superatmospheric pressure, with the consequent attendant danger of fire, particularly in the lower altitude combat zone or as the plane approaches the ground. In any event, the pressure in the tanks should be eliminated at near ground level altitudes to minimize the danger of bursting fuel tanks and spraying fuel which might occur during a crash landing.

To minimize the danger attendant upon the maintenance of an explosive mixture of volatile gasoline and air above the fuel in the tank it is proposed, in one form of the instant invention, to use an inert gas, such as nitrogen or carbon dioxide, as the pressure fluid in a fuel tank pressure system. With such a pressure system a sensitive and accurate pressure regulator is obviously desirable so that the pressure fluid may be used as efficiently as possible to reduce the quantity of inert gas required to be carried in the aircraft. Conservation of gas is a further reason, in addition to the safety considerations explained above, for eliminating the use of superatmospheric tank pressures at lower altitudes at which fuel boiling and oil pump cavitation are less serious problems.

It is therefore an object of this invention to provide an improved pressure regulator for a fuel or oil tank pressure system, which is operable by pressure supplied by the manifold of a supercharged engine or by pressure supplied from any suitable source.

Another object of the invention is to provide a pressure regulator for such a system whereby the pressure fluid, regardless of kind, may be used as efficiently as possible and with a minimum of loss.

A still further object comprehends the provision of a pressure regulator sensitive to small changes in atmospheric pressure so that the regulator will operate only at a specific desired pressure or within very close limits of desired pressure.

A still further object is to provide a pressure regulator which will be automatic in operation beyond a critical altitude, and which will be inoperative to supply pressure to the tank below a critical altitude.

Yet another object is to provide a pressure regulator which can be made inoperative at the control of an operator.

A still further object comprehends the provision of a construction which will insure that the regulator will never maintain a pressure less than atmospheric.

Yet another object is the provision of a construction which will insure that the regulator will never maintain a pressure in excess of a desired amount.

Other objects and desirable advantages of the pressure regulator forming a part of this invention will be apparent from a study of the description following, in which:

Figure 6 is a sectional view taken substantially along the line 6—6 of Figure 4.

While the embodiment shown and described with reference to the accompanying drawings has been found particularly advantageous for the purposes intended, it is not intended that the inventions be limited in any way by the embodiment here shown, nor otherwise than by the terms of the appended claims.

Figure 1:
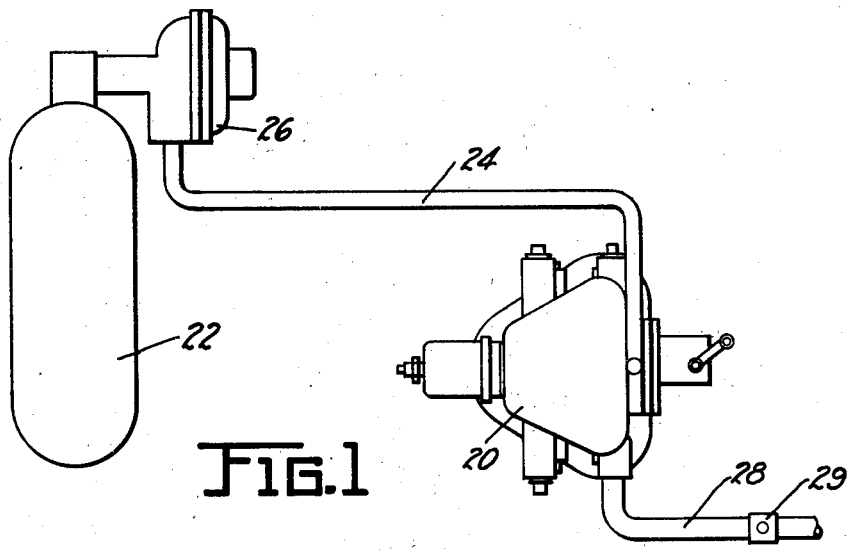
Figure 1 is a diagrammatic view showing a tank pressure control system in which the pressure regulator forming a part of this invention is connected to a source supplying inert gas held under pressure, as for example, carbon dioxide.

With reference to Figure 1 there is shown a pressure regulator 20 connected by means of a conduit 24 to a source of inert gas 22 maintained at superatmospheric pressure. The pressure within the source 22 may be at several atmospheres, and in such case a reducing valve 26 of any known type may be connected in the line 24 between the regulator 20 and the source 22. Pressure regulator 20 is connected to any vessel to be placed under pressure, as for example to a fuel or oil tank, by a pressure conduit 28, which if desired may be provided with a check valve 29, preferably adjacent the tank, to prevent flow of fluid from the tank to the regulator as during period of inverted flight.

Figure 2:
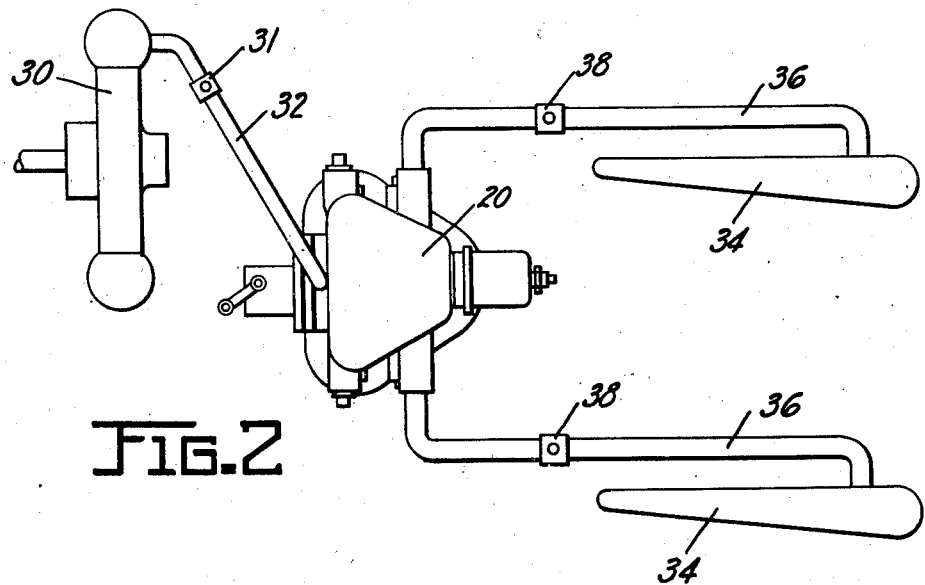
Figure 2 is a similar view of another arrangement wherein the pressure regulator is connected to a pressure source maintained by the supercharger of an aircraft.

In the arrangement of Figure 2, the pressure regulator 20 is connected to the high pressure side of a supercharger 30 through a conduit 32. A check valve 31 may be provided in the conduit 32 to prevent the possibility of a vacuum being applied to the regulator 20 at such times as the supercharger outlet pressure is less than atmospheric pressure. The regulator 20 is connected to fuel tanks 34 by means of conduits 36, which may be provided with check valves 38 for permitting the passage of gaseous fluid, but preventing the return of liquid from the tanks 34.

Figure 3:
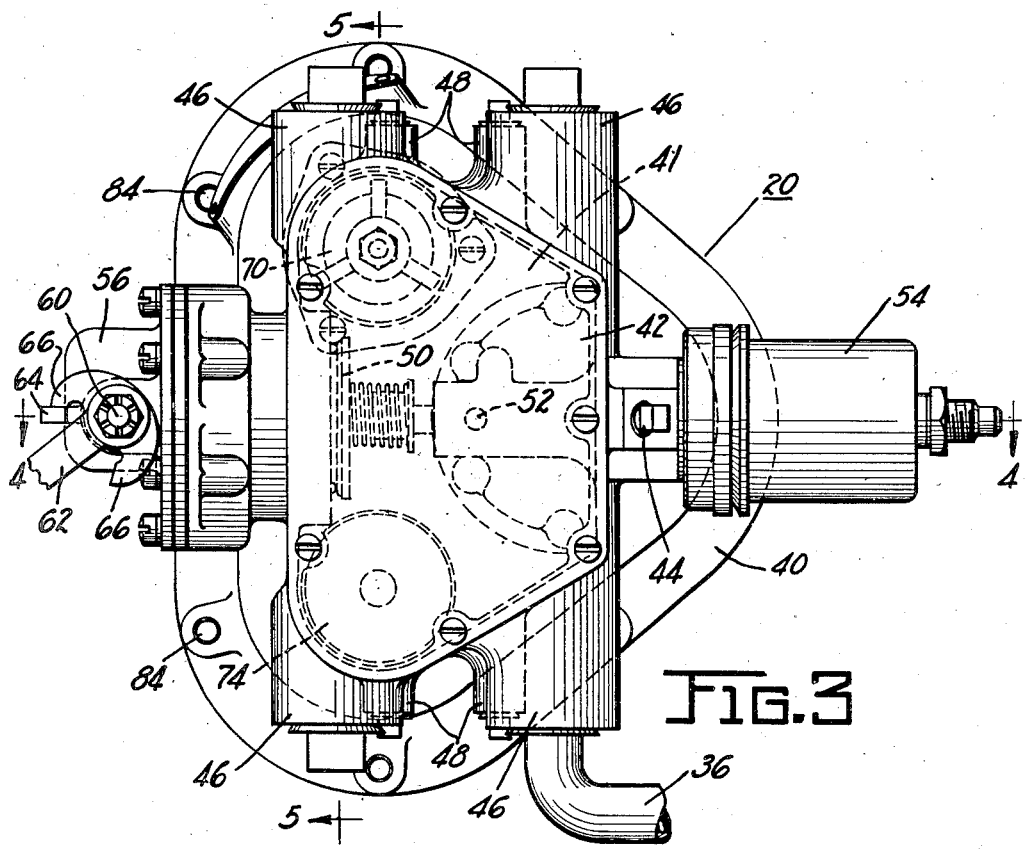
Figure 3 is a plan view of the pressure regulator shown in Figures 1 and 2.

The pressure regulator 20 is shown in plan view in Figure 3 and includes a body 40 having a main pressure chamber 41 therein which is closed on its upper side by a trapezoidal cover plate 42 secured to the body 40 as by the cap bolts shown. The pressure chamber 41 is supplied with pressure from any desired source at an entrance port 44, and is connected to the fuel or oil tanks by means of the conduit 36 connected to the regulator at port 46. Other ports 46 are provided which may also be connected to the tanks, but are shown as being unused and closed by conventional pipe plugs. A plurality of pressure gauge ports 48 are provided which may be connected to one or more pressure gauges to indicate the pressure obtaining in the chamber 41.

Figure 4:
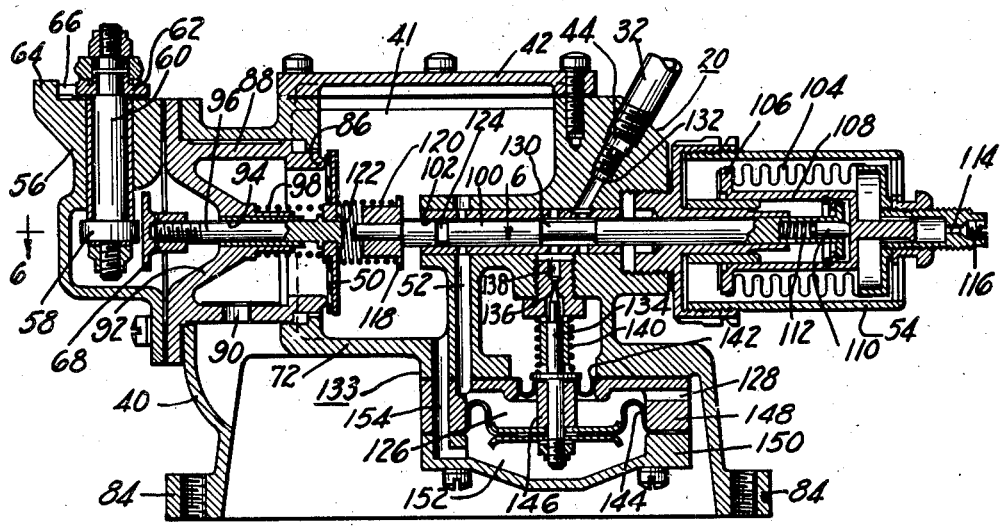
Figure 4 is a sectional view taken along the line 4—4 of Figure 3.

Means are provided to vent the pressure within the chamber 41 under conditions later to be described. As shown in Figures 3 and 4 these include a main vent valve 50 and an auxiliary vent passage 52 which are controlled by an altitude sensitive control located within a housing 54, the details and operation of which will be described later.

I provide means for manually controlling the main vent valve 50 and the auxiliary vent passage 52 which comprises a manual control housing 56 having therein a cam 58 (shown in Figures 4 and 6) mounted on a shaft 60 which may be rotated by moving a control handle 62 secured to the shaft 60.

Figure 5:
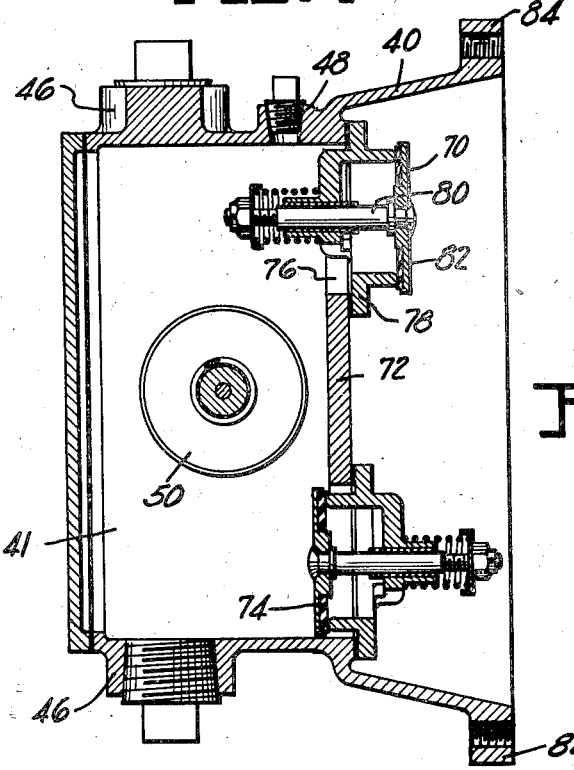
Figure 5 is a sectional view taken along the line 5—5 of Figure 3.

As a safety measure to insure that the pressure within the chamber 41 never exceeds a desired value above atmosphere, a blow-off valve 70 located in a lower wall 72 of the chamber 41 is provided as best shown in Figure 5. As a matter of practice this valve is set to open at approximately 4½ pounds per square inch gauge, but obviously may be set to open at any desired value.

To prevent the possibility of subatmospheric pressure obtaining within the chamber 41, a vacuum relief valve 74 located similarly in the lower wall 72 of the chamber 41, shown in Figure 3 in dotted outline and in Figure 5 in section, is provided.

The regulator 20 may be secured to any supporting structure, not shown, as by means of a flange extension 84 of the body 40 and the threaded holes as shown in Figures 3, 4 and 5.

Referring now to Figure 4, in which the various parts are shown in the positions they occupy at altitude, the main vent valve 50 is adapted to close an open end 86 of a cylindrical member 88 having an opening 90 therein to atmosphere. For supporting the main vent valve the cylindrical member 88 has a conical-shaped web 92 containing a bore 94 in which a stem 96 is movable, at one end of which the main vent valve 50 is secured. A spring 98 which abuts the web 92 tends to urge the main vent valve to open position. As shown, the main vent valve 50 is closed thereby preventing the venting of the chamber 41 to atmosphere through the opening 90.

Means are provided for determining the opening and closing of the main vent valve 50, the auxiliary vent formed at the passage 52 and the ingress of pressure fluid to the chamber 41, and includes a second stem 100 which is slidable within a bore 102 in the housing 40. For controlling the movements of the stem 100 there is contained within the housing 54, which is secured to the regulator body 40, a sealed capsule or closed bellows 104, the free end 106 of which is arranged to provide longitudinal movement to the stem 100 through a cup-shaped member 108 abutting a nose piece 110 which is spring-loaded by a spring 112. This construction permits slight angular movement of the bellows 104 relative to the stem 100 to accommodate slight misalignment of the various parts, as is more particularly described and claimed in Patent No. 2,376,711 of Frank C. Mock. The stationary end of the bellows 104 is held to the housing 54 in the manner shown. For varying the pressure within the bellows 104 a port 114 is provided which is normally closed by a plug 116.

For effecting the travel of the main vent valve 50 to closed position as the sealed bellows extends when altitude is gained, the left end of the stem 100 has mounted thereon a pilot 118 which carries a spring 120, the left end of which is based on the main vent valve 50. When the stem is displaced sufficiently to the left by the extension of the bellows 104, the left end of the stem 100 bottoms against a nose 122 on the end of the stem 96.

The auxiliary vent passage 52 is controlled by the movement in and out of register with the passage 52 of a constricted or annular grooved portion 124 on the stem 100. At such times this constricted portion 124 is in register with the passage 52, the pressure chamber 41 is provided with an auxiliary vent by means of the passage 52, a diaphragm-walled chamber 126, and a passage 128.

For controlling the ingress of pressure to the pressure chamber 41 a second constricted or grooved portion 130 on the stem 100 is located adjacent the entrance port 44, which may have a throttling restriction 132 as shown. The throttling restriction may instead be a check valve which will permit only of pressure admission, and its use is indicated where the check valve 31 of Figure 2 is not placed in the conduit 32. At all times the constricted portion 130 is in communication with the entrance port 44.

The admission of pressure fluid to the chamber 41 is effected and controlled by a valve assembly 133 which is spring and diaphragm controlled in its movements. As shown in Figure 4 the valve assembly consists of a needle valve member 134 which is seated upon a hollow valve seat 136 which has a passage 138 therein at times communicating with the constricted portion 130 of the stem 100. The valve member 134 tends to be urged in part to open position by a spring 140, and has mounted on it a pair of diaphragms, 142 and 144 which are appropriately spaced by a collar 146 surrounding the member 134. The peripheries of diaphragms 142 and 144 are held to the housing 40 by means of an annular member 148 and a cap 150, which in turn are held to the body 40 by any suitable means as the cap bolts shown. Thus diaphragm 142 forms a movable wall of the pressure chamber 41, and forms with diaphragm 144, the chamber 126 which is constantly exposed to atmosphere by means of the passage 128. A second chamber 152 is thus formed by the diaphragm 144 and the cap 150, and chamber 152 is constantly subjected to the pressure within the pressure chamber 41 through a passage 154.

Referring now more particularly to the means for returning the pressure regulator to inoperative position, the manual control will now be described particularly with reference to Figures 3, 4, and 6. Journalled within the housing 56 is a shaft 60 which carries at its lower end the cam 58 which has a profile as shown. Mounted on the housing 56 is a stop 64 which is engaged at times by one of a pair of ears 66 for limiting the angular travel of the cam 58, and which are integral with the control handle 62 which is mounted on the upper end of the shaft 54 in the manner shown. Cam 58 is adapted at times to contact a mushroom shaped tappet 68 secured to the stem 96 to move the stem 96 and the main vent valve 50 to the right to vent the pressure chamber 41.

The safety means for insuring that superatmospheric pressure above a certain value never obtains in the pressure chamber 41, and that subatmospheric pressure in said chamber never obtains are shown as valve assemblies 70 and 74 respectively in Figure 5. The pressure relief valve 70 is mounted in an opening 76 in the lower wall 72 of the pressure chamber 41, and consists of a spider 78 mounted across the opening 76, which supports a spring-biased stem 80 which has secured to the end thereof a flat circular disc 82 for closing the opening 76.

The valve 74 is of the same type as valve 70, the parts thereof being reversed in position, and is so disposed with reference to the lower wall 72 of the pressure chamber 41, that the subatmospheric pressure within the chamber 41 will never obtain a value as determined by the load in the spring for said valve.

The operation of the pressure regulator just described is as follows:

In the position shown in Figure 4, the regulator mechanism is in the operating or altitude position, the auxiliary vent formed at the passage 52 and the main vent valve 50 being closed. The sequence of operations in order for the regulator mechanism to attain the position shown in Figure 4 is as follows:

At altitudes corresponding to sea level density altitude, the sealed bellows 104 is at its most contracted position and the stem 100 is to the right of the position shown in Figure 4 thereby closing the admission of pressure fluid to the pressure chamber 41 since the passage 138 in the valve seat 136 will be lapped by a non-constricted portion of the stem 100. At sea level density altitudes the main vent valve 50 is open since the release of tension in the spring 120 permits spring 98 to elongate to open the main vent valve. At this time the auxiliary vent, formed at the passage 52, is open, since the constricted portion 124 is in register with the passage 52, the movement of stem 100 to the right being limited, as shown, by the member 118. If desired however, the member 118 may be freely mounted on the stem 100, or otherwise arranged, to permit the constricted portion 124 to move to the right of passage 52 at ground level, it being noted that at this time the vent 52 serves no particular function since the chamber 41 is vented to atmosphere through the main vent 50.

When the aircraft has reached a selected altitude beyond which pressure control of the tanks 34 is deemed necessary or desirable, the bellows 104 will have extended and will have moved the stem 100 to a position whereby the main vent valve 50 is closed. The auxiliary vent at the passage 52 is at least partially open at the time the main vent valve 50 closes, and at this time serves as the sole atmospheric vent for the chamber 41.

Upon further movement of the stem 100 to the left, the auxiliary vent is closed and substantially simultaneously therewith the restricted portion 130 of the stem 100 is brought into register with the passage 138 to the valve assembly 133. Pressure will then be admitted from the source 22 or 30 at the port 44, and will enter the passage 138 and pass the valve member 134 and into the main pressure chamber 41 of the regulator body 40. The pressure will continue to be admitted until it reaches a value in the neighborhood of 4 pounds per square inch gauge or any other specified tank pressure, and the valve member 134 will close when the resultant upward force on the diaphragm 144 is enough to overcome the load in spring 140 and the downward pressure against the diaphragm 142.

As fuel is withdrawn from the tanks 34, shown in Figure 2, the pressure within the chamber 41 of the regulator 20 will diminish, and the valve 134 will again open and admit additional gaseous fluid under pressure until equilibrium is attained once more.

As the aircraft descends the reverse sequence of operations takes place. The increase of pressure on the altitude sensitive seated bellows 104 causes it to contract and to move stem 100 to the right. The initial movement to the right of the stem 100 will cause the auxiliary vent at the passage 52 to open which may be concurrent with the lapping of the passage 138 by the stem 100, or which may be slightly before such lapping. With the auxiliary vent opened the pressure within the chamber 41 is immediately vented to atmosphere. It will be noted, however, that pressure fluid may still be supplied to the pressure regulator 20 as long as the passage 138 is not lapped by a non-constricted portion of the stem 100, and it will be noticed also that whatever fluid is supplied will be immediately vented through passage 52, chamber 126, and passages 128.

A further descent of the aircraft will cause the stem 100 to move still more to the right. This movement tends to release the load in spring 120, and the load in spring 98 will move the main vent valve 50 from its seat at the opening 86. However, the opening of main vent valve 50 takes place only after the supply of pressure fluid to the chamber 41 has been cut off by the lapping of passage 138.

As has been explained in part previously, the operation of the cam 58, controlled by the movements of the handle 62, will return the regulator 20 to inoperative position. The first movements of the cam 58 will lift main vent valve 50 from its seat, and the subsequent movements of cam 58 will cause the nose 122 to strike the left end of stem 100 which will then be moved to the right substantially simultaneously opening the vent passage 52 and lapping passage 138, and finally closing the auxiliary vent passage 52.

While the arrangement described is adapted for having the auxiliary vent close after the main vent has already closed with the simultaneous entrance of the pressure fluid upon the closing of the auxiliary vent, it is obvious that the parts may be arranged so that pressure is admitted before the auxiliary vent moves to the closed position after the closing of the main vent. This may be indicated where the dissipation of the pressure fluid through the regulator is unimportant and is not a criterion of design.

Thus has been described a new and useful improvement in pressure regulators particularly for use with highly volatile fuels such as are used with aircraft, and which may also be readily used in connection with the oiling systems found in aircraft. While the embodiment has been found to be particularly useful for the purpose desired, the invention is in nowise limited by the embodiment shown, other arrangements and other sequences of operation being adapted according to designer's choice, nor otherwise than by the claims appended hereto.

I claim:

1. A pressure regulator comprising a body provided with a chamber having an entrance port in communication with a pressure source and at least one exit port and a main and an auxiliary vent to atmosphere, a control sensitive to changes in atmospheric pressure for the entrance port and the vents including a shiftable member at times covering the entrance port and having a reduced portion at times in register with the auxiliary vent for opening said vent and a second reduced portion at times in register with the entrance port to uncover the latter, a valve and means for actuating the latter to admit pressure from the source to the regulator chamber when the second reduced portion is in register with the entrance port, valve means between the shiftable member and the main vent, and means for actuating said valve means to effect closing of the main vent before the auxiliary vent is closed and the entrance port is opened.

2. A pressure regulator comprising a body provided with a chamber having an entrance port in communication with a pressure source and at least one exit port and a main and an auxiliary vent to atmosphere, a control comprising a sealed capsule sensitive to changes in atmospheric pressure for the entrance port and the vents, said control including a shiftable member at times closing said entrance port and having a reduced portion at times in register with the auxiliary vent for opening said vent and a second reduced portion at times in register with the entrance port to uncover the latter, a valve and means for actuating the latter to admit pressure from the source to the regulator chamber when the second reduced portion is in register with the entrance port, and valve means between the shiftable member and the main vent operable to effect closing of the main vent before the auxiliary vent is closed and the entrance port is opened.

3. A pressure regulator comprising a body provided with a chamber having an entrance port in communication with a pressure source, and at least one exit port and a main and an auxiliary vent to atmosphere, a control sensitive to changes in atmospheric pressure for the entrance port and the vents including a shiftable member which when the regulator is inoperative closes the entrance port and has a reduced portion at times in register with the auxiliary vent for opening said vent and a second reduced portion at times in register with the entrance port to open the latter, a valve and means for actuating the same to admit pressure from the source to the regulator when the second reduced portion is in register with the entrance port, valve means between the shiftable member and the main vent operable to effect closing of the main vent before the auxiliary vent is closed and the entrance port is opened, and means for returning the control to inoperative position and to open the main and auxiliary vents.

4. A pressure regulator comprising a body provided with a chamber having an entrance port in communication with a pressure source and at least one exit port and a main and an auxiliary vent to atmosphere, a control unit movable in response to atmospheric pressure for the entrance port and the vents and including a shiftable member which when the regulator is inoperative functions to close the entrance port and has a reduced portion at times in register with the entrance port to open the latter and a second reduced portion at times in register with the auxiliary vent for opening said vent, a valve and means for actuating the same to admit pressure from the pressure source to the regulator chamber when the first reduced portion is in register with said valve, a main vent valve between the shiftable member and the main vent operable to effect closing of the main vent before registration of the first reduced portion with the said first valve and after the register of the second reduced portion with the auxiliary vent, subsequent movement of said control and shiftable member closing the auxiliary vent but only after the first reduced portion is in register with the said first valve to admit pressure to the regulator.

5. A pressure regulator comprising a body provided with a chamber having an entrance port in communication with a pressure source and at least one exit port and a main and an auxiliary vent to atmosphere, a control movable in response to changes in atmospheric pressure for the entrance port and the vents including a shiftable member which when the regulator is inoperative functions to close the entrance port and has a reduced portion at times in register with the entrance port to open the latter and a second reduced portion at times in register with the auxiliary vent for opening said vent, a diaphragm controlled valve movable to admit pressure from the pressure source to the regulator chamber when the first reduced portion is in register with the entrance port and said valve, a main vent valve between the shiftable member and the main vent operable to effect closing of the main vent before registration of the first reduced portion with the said first valve and after registration of the second reduced portion with the auxiliary vent, subsequent movement of said control and shiftable member thereafter closing the auxiliary vent but only after the first reduced portion is in register with the said first valve to admit pressure to the regulator.

6. The invention according to claim 4 wherein means are provided manually to return the control to inoperative position and to open the main and auxiliary vents.

7. A pressure regulator for an aircraft tank pressure control system comprising a body member including a pressure chamber adapted to be connected with a tank, a bore in said member, a passage and a conduit in intersecting relation with the bore adapted to connect the pressure chamber with atmosphere and with a source of pressure fluid respectively, a stem slidable in the bore and having portions for opening and closing said passage and conduit, a valve in said conduit, and means responsive to the pressure in said chamber for controlling the valve.

8. A pressure regulator for an aircraft tank pressure control system comprising a pressure chamber adapted to be connected to a tank, separate main and auxiliary vents to atmosphere from said chamber, a conduit leading to the chamber from a source of pressure fluid, a sealed capsule in constant communication with the atmosphere and adapted to expand and contract in response to changes in atmospheric pressure, means arranged to control the main and auxiliary vents and said conduit, said means being operatively connected to said capsule to be actuated in one direction to close the main and auxiliary vents successively and communicate the conduit with said chamber and in the opposite direction to open said auxiliary and main vents successively and close off communication between said conduit and said chamber.

9. A pressure regulator for an aircraft tank pressure control system comprising a pressure chamber adapted to be connected to a tank, separate main and auxiliary vents to atmosphere from said chamber, a conduit leading to the chamber from a source of pressure fluid, a sealed capsule adapted to expand and contract in response to changes in atmospheric pressure, means arranged to control the main and auxiliary vents and said conduit, said means being operatively connected to said capsule to be actuated in one direction to close the main and auxiliary vents successively and communicate the conduit with said chamber and in the opposite direction to open said auxiliary and main vents successively and close off communication between said conduit and said chamber, valve means controlling admission of pressure fluid from said conduit to said chamber, and means responsive to changes in pressure in said chamber controlling said valve means.

10. A pressure regulator for an aircraft tank pressure control system comprising a pressure chamber adapted to be connected to a tank, separate main and auxiliary vents to atmosphere from said chamber, a conduit leading to the chamber from a source of pressure fluid, a sealed capsule in constant communication with the atmosphere and adapted to expand and contract in response to changes in atmospheric pressure, valve means arranged to control the main and auxiliary vents and said conduit, said valve means being operatively connected to said capsule to be actuated in one direction to close the main and auxiliary vents successively and communicate the conduit with said chamber and in the opposite direction to open said auxiliary and main vents successively and close off communication between said conduit and said chamber, and means for maintaining the pressure in said chamber at a predetermined value when both the main and auxiliary vents are closed.

ROBERT H. PETERSON.

REFERENCES CITED

The following references are of record in the file of this patent:

UNITED STATES PATENTS

| Number | Name | Date |
| --- | --- | --- |
| 2,154,693 | Noble | Apr. 18, 1939 |
| 1,982,045 | Clithero | Nov. 27, 1934 |
| 1,398,315 | Cawthra | Nov. 29, 1921 |
| 1,471,417 | Rateau | Oct. 23, 1923 |
| 1,244,651 | Snell et al. | Oct. 30, 1917 |
| 1,342,830 | Snell | June 8, 1920 |
| 1,988,797 | Hueber et al. | Jan. 22, 1935 |
| 2,151,043 | Paton | Mar. 21, 1939 |
| 1,354,580 | Schumacher | Oct. 5, 1920 |
| 2,005,530 | Hallenbeck | Sept. 29, 1936 |
| 2,188,609 | McJean | June 30, 1940 |
| 2,313,149 | Jacobsson | Mar. 9, 1943 |